April 30, 1963   D. B. WORSTER   3,087,759
CONVERTIBLE VEHICLE BODY
Filed Feb. 27, 1958   2 Sheets-Sheet 1
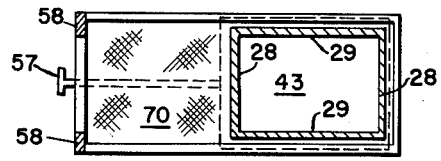
FIG.7
FIG.3
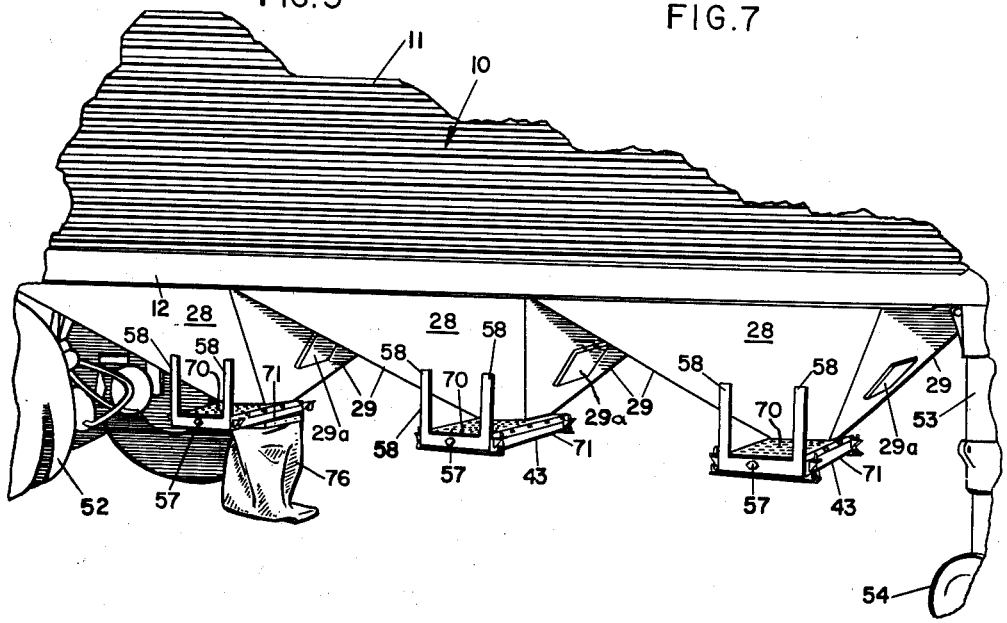
FIG.1
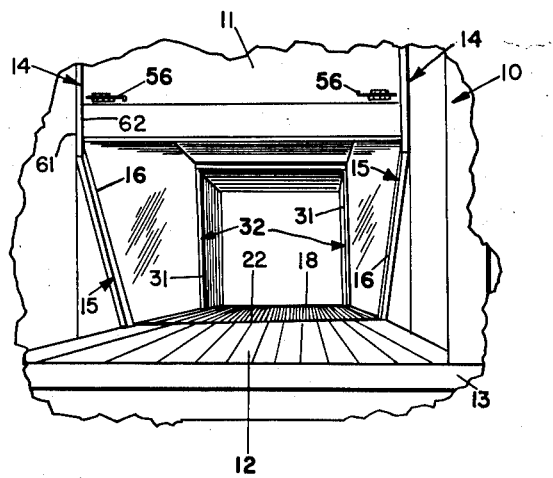
INVENTOR.
DAVID B. WORSTER
BY
Charles L. Lorenched
attorney.

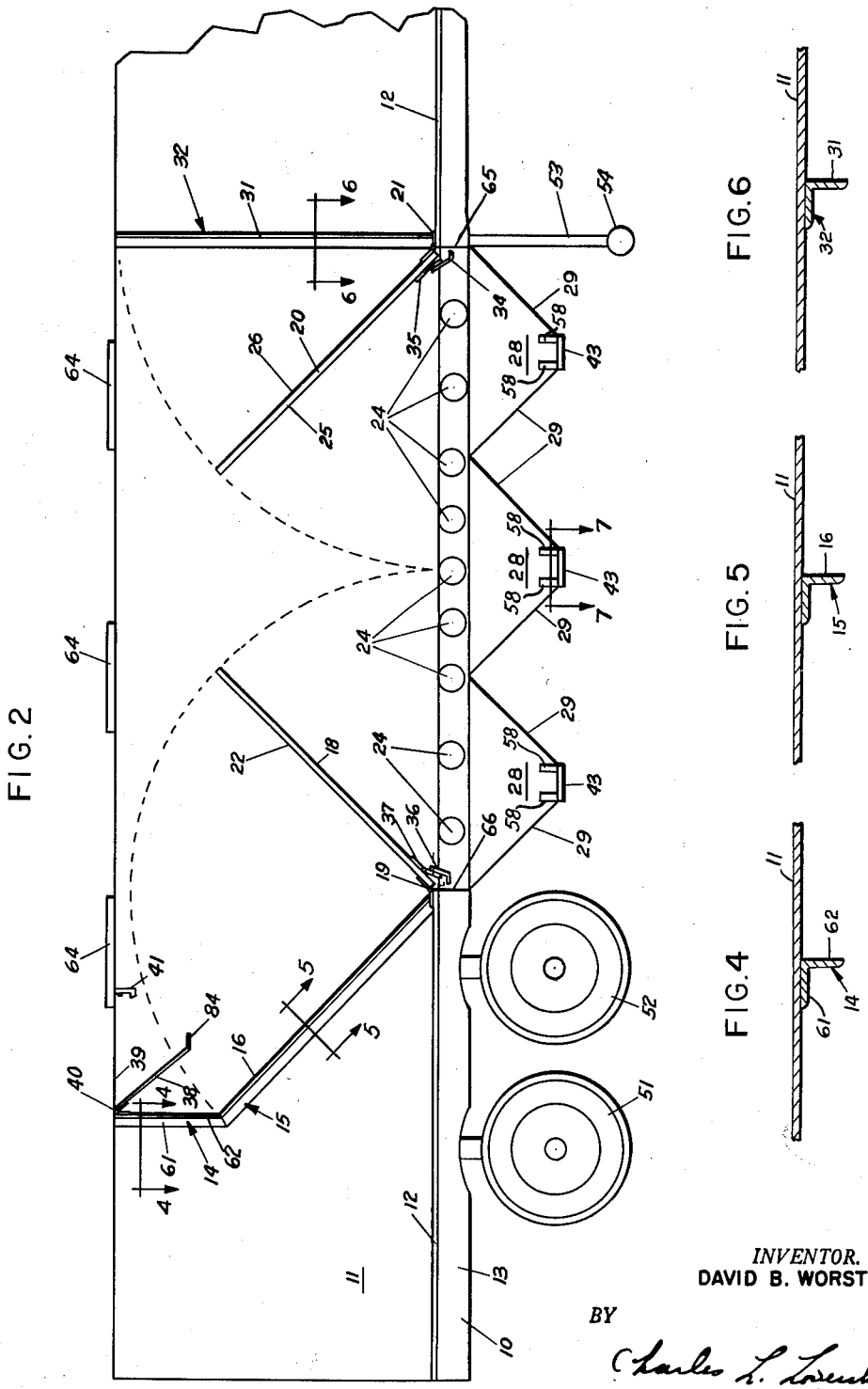

United States Patent Office 3,087,759
Patented Apr. 30, 1963

3,087,759
CONVERTIBLE VEHICLE BODY
David B. Worster, 69 Gibson St., North East, Pa.
Filed Feb. 27, 1958, Ser. No. 718,007
2 Claims. (Cl. 298—24)

This invention relates to a trailer or truck body or a body for other vehicles and, more particularly, to a convertible body which may be used for transporting granular material in a sanitary enclosure or which may be converted to convey regular packaged cargo in another condition.

Previous truck beds of the type disclosed have been unsanitary and were, therefore, not suitable for conveying granular material in a sanitary manner. Further, they have not been designed so as to be conveniently convertible from a packaged cargo transferring bed to one for transporting granular cargo.

The bed disclosed herein is disclosed as specifically designed for use in an auto trailer; however, similar principles could be employed in railroad cars or truck bodies per se.

The trailer body disclosed herein has been designated to meet the transportation needs and increasing demands for handling of granular materials in bulk, particularly those which must be kept sanitary, and still be suitable for hauling ordinary materials shipped in containers in the reverse direction. The trailer body is particularly useful if the distance of transportation is so great that an economical operation dictates that the truck must be loaded for the return trip. The trailer body has been so designed that it can be utilized to its fullest capacity in all states of the United States of America, regardless of various types of laws regulating the weights allowed upon highways. It allows complete examination of the trailer by the shipper before loading of the trailer to insure a sanitary and a satisfactory condition thereof.

It is, accordingly, an object of this invention to provide a vehicle body which is simple in construction, economical to manufacture, and simple and efficient to use.

Another object of this invention is to provide a vehicle body which can be converted from a body for conveying bulk cargo to a body for conveying granular material.

Still another object of the invention is to provide an improved vehicle body.

A further object of the invention is to provide an improved convertible vehicle body which is sanitary when in one position and which is convertible from a bulk cargo to a granular cargo device in another position.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of constructon without departing from the spirit or sacrificing any of the advantages of the invention.

In the drawings:

FIG. 1 is a fragmentary rear perspective view of a vehicle body according to the invention from the open rear end thereof;

FIG. 2 is a fragmentary side view of the vehicle shown in FIG. 1 with the right side of the body removed;

FIG. 3 is an enlarged fragmentary perspective view of the vehicle;

FIG. 4 is a partial cross sectional view taken on line 4—4 of FIG. 2;

FIG. 5 is a partial cross sectional view taken on line 5—5 of FIG. 2; and

FIG. 6 is a partial cross sectional view taken on line 6—6 of FIG. 2.

FIG. 7 is a cross sectional view taken on line 7—7 of FIG. 2.

Now with more specific reference to the drawings, a truck trailer 10 is shown having a body 11. The body 11 is shown with the right side of the trailer 10 removed to show the inside to give a better understanding of the structure thereof.

The trailer body 11 is shown with a fixed floor panel 12 which is supported by side frame rails 13. The side rails 13 may be made of channel iron or the like. The left side wall of the trailer 10 has angle irons 14 attached thereto and extending vertically therefrom. A similar angle iron will be attached to the inside surface of the right side wall of the trailer 10 parallel to the angle irons 14 shown. The channel irons 14 have a flange 62 which extends perpendicular to the left side wall and an edge 61 disposed parallel thereto which is attached to the left side of the trailer body 11. An angle iron 15 is attached to the left wall and extends downwardly and forwardly at an angle of approximately forty-five degrees. The edge of the angle iron 15 is attached to the left wall and the other edge 16 projects at right angles to the wall. A similar angle iron is attached to the inside surface of the right wall and is disposed parallel to the angle iron 15 and, also, with the outer edge parallel to the edge 16. Suitable openings closed by covers 64 which are conventional on trailer bodies are provided.

A floor sheet 18 is hinged to the floor by means of a piano type hinge 19 and a floor sheet 20 is hinged to the floor by means of a hinge 21. The undersides of the floor sheets 18 and 20 will be made of a smooth sheet of material such as a sheet of stainless steel. An upper side 22 of the sheet 18 will be corrugated lengthwise of the trailer 10 so that the corrugations form structural strength by way of a beam lying across supports 24. Likewise, an underside 25 of the sheet 20 will be smooth and an upper side 26 will be corrugated for similar reasons.

The round support members 24 are made of steel tubing or the like and the outside thereof will be smooth. The support members 24 are attached at their opposite ends to the side rails 13 and the support members 24 extend laterally of the truck body 11 and overlie hoppers 29. The hinges 19 and 21 are of a piano hinge type so that they prevent leakage of the bulk cargo when the swingable floor sheets 18 and 20 are swung to a position with the top side 22 of the floor sheet 18 overlying an inwardly extending horizontal leg of the angle iron 15. The sheet 20 will then be lying against a vertical leg 31 of an angle. 32.

A steel plate 34 is hinged to the swingable floor sheet 20 by means of a piano hinge 35. The steel plate 34 overlies the piano hinge 21 and, therefore, aids in preventing any leakage of granular material being transported at the joints thereof and at the corners of the hoppers 29. A similar plate 36 is hinged to the swinging floor sheet 18 at 37 for a similar purpose to that for which the plate 34 is provided.

A plate 38 is hinged to a roof 39 of the trailer 10 by means of a piano hinge 40. The plate 38 may be swung up and attached to the roof 39 by means of a catch 41 having laterally extending bolts 56 thereon in order to provide uninterrupted head room when the trailer 10 is being used for transporting regular packaged cargo. When the trailer is to be used to transport bulk cargo such as loose sugar, the sheet 18 may be swung back to rest on the edge 16 of the angle iron 15. The plate 38 may be swung down so that its rear edge rests on an outwardly extending flange 62 of the angle iron 14. A leg 84 which is an end of the plate 38 disposed at an acute angle thereto will lie along the upper edge of the thin top surface of the sheet 18.

The hoppers 29 are in the shape of the inverted frustum of a pyramid having sides 28 which extend upwardly and outwardly. The hoppers 29 are disposed as shown and form a bottom for the trailer 10 when the trailer 10 is used for bulk materials. The hoppers 29 each have a suitable sliding door 43 with a handle 57 thereon for keeping the bulk material in place. The sliding doors 43 are disposed at the lower ends of the pyramid shaped hoppers 29 so that a square opening for the discharge gates is formed thereby. The outer ends of the supports for the sliding doors 43 are reinforced by vertical supporting members 58 which are attached to the lateral edges of the hoppers 29. The hoppers 29 are formed in the shape of a frustum of a pyramid with an opening formed at the apex thereof. The bases of each hopper 29 join each other. The sliding doors 43 are supported in the space between two vertically spaced gratings 70 which surround the openings in the hoppers 29. The gratings 70 are held in spaced relation by side channel members 71. Vertical support members 58 are welded to the hoppers at their upper ends and to the angular side members at their lower ends. The doors are flat plate like members which slide between the top grating and the bottom grating and rest on the bottom grating. Handles 57 are attached to the doors to extend through the support members 58 whereby the doors can be slid to open and closed position. A bag 76 may be supported over the opening at the lower part of the hopper to receive granular material from the hopper. The front upper edge of the front hopper and the rear upper edge of the rear hopper extend up at 65 and 66, respectively, to connect to the fixed floor panel 12 and thereby complete the closure. The trailer 10 is provided with the usual rear wheels 51 and 52 connected thereto by means of suitable springs and front storing wheels 54 are attached thereto by means of a jacking arrangement 53. Plates 29a are reinforcing plates for the purpose of attaching vibrators to assist in causing the material to flow more freely in unloading.

In use, for conveying cargo, the shets 18 and 20 will be swung down and they will rest on the horizontal support members 24 with the corrugated sides thereof up and the plate 38 can be swung up. The trailer 10 can then be used as an integral vehicle for transporting regular cargo with clear floor and head room like any other trailer of this type.

When the rear swinging floor sheet 18 is swung to a rearward position to lie along the edge 16 of the angle iron 15 and the plate 38 is swung down to form a seal over the top of the sheet 18, the front swinging floor sheet 20 will be swung up to a vertical position with the plate 34 overlying the hinge 21. In this position, the inside of the trailer 10 can be inspected for sanitary conditions and the bulk materials such as sugar can then be stored in the trailer 10 for transportation and space will be provided at both ends of the trailer, both ahead and behind the bulk cargo, for hauling packaged freight.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A convertible vehicle of the character described comprising a floor supporting frame, spaced side walls and a front and a rear wall attached to said frame and extending upwardly therefrom, a roof attached to said side walls, a rear fixed floor section attached to said frame at a rear portion thereof, a front fixed floor section attached to a front portion of said frame, said fixed floor sections defining an opening therebetween, spaced support members attached at their opposite ends to said frame and extending between said side walls, a hopper secured to said frame, said hopper having a closure below said opening, a flanged member attached to the inside surface of each said side wall adjacent an edge of said rear fixed floor section at said opening and extending upwardly therefrom at an inclined angle to said floor section, said flanged members extending inwardly from said side walls, a rear swinging floor sheet hingedly attached to said rear fixed floor section adjacent the edge of said fixed floor section opening and swingable from a horizontal position over said opening wherein the side edges of said swinging floor sheet rest on said support members to a position whereat said swinging sheet rests on said flanged members at an inclined angle to said floor sections and terminates in spaced relation to said roof and said rear wall, and a plate extending transversely of said vehicle and hingedly connected to said roof at a position spaced from the rear wall of said vehicle and swingable from a horizontal position generally parallel to said roof to a position with one edge thereof overlying the upper edge of said swinging floor sheet forming a continuation thereof, thereby forming a part of a wall of a container for lading, said sheet having its side edge disposed adjacent the sides of said side walls to form a bin therewith.

2. The vehicle recited in claim 1 wherein said frame has a front floor sheet hingedly attached to said front fixed floor section, upwardly extending flanged members attached to said side walls adjacent an edge of said fixed floor section at said opening and extending inwardly therefrom, said front floor sheet swingable from a horizontal position resting on said support members to an upward position resting against said upwardly extending members, forming a compartment at the front end of said vehicle defined by said front floor sheet, said side walls, and said front wall.

References Cited in the file of this patent
UNITED STATES PATENTS

| | | |
|---|---|---|
| 288,792 | Goodrich | Nov. 20, 1883 |
| 466,470 | Souder | Jan. 5, 1892 |
| 1,071,029 | Campbell | Aug. 26, 1913 |
| 1,344,322 | Walker | June 20, 1920 |
| 1,935,057 | Natali | Nov. 14, 1933 |
| 1,975,955 | Kobarynka et al. | Oct. 9, 1934 |
| 2,566,977 | Boulden | Sept. 4, 1951 |
| 2,648,293 | Dorey | Aug. 11, 1953 |
| 2,772,919 | Jones | Dec. 4, 1956 |
| 2,853,204 | Jones | Sept. 23, 1958 |